(12) United States Patent
Inaoka et al.

(10) Patent No.: US 6,523,628 B2
(45) Date of Patent: Feb. 25, 2003

(54) SMALL-SIZED VEHICLE

(75) Inventors: Hiroshi Inaoka, Saitama (JP); Masao Ogawa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 21 days.

(21) Appl. No.: 09/758,223

(22) Filed: Jan. 12, 2001

(65) Prior Publication Data

US 2001/0017228 A1 Aug. 30, 2001

(30) Foreign Application Priority Data

Jan. 14, 2000 (JP) ........................................ 2000-006837

(51) Int. Cl.⁷ .............................................. A62D 25/14
(52) U.S. Cl. ...................... 180/90; 180/89.11; 180/311; 280/DIG. 5; 296/70; 296/192
(58) Field of Search ................................ 180/89.11, 90, 180/89.1, 311; 296/70, 192; 280/DIG. 5

(56) References Cited

U.S. PATENT DOCUMENTS 6,293,616 B1 * 9/2001 Williams et al. ....... 280/DIG. 5

FOREIGN PATENT DOCUMENTS

JP        9286348 A     11/1997

* cited by examiner

*Primary Examiner*—Paul N. Dickson
*Assistant Examiner*—Deanna Draper
(74) *Attorney, Agent, or Firm*—Birch, Stewart, Kolasch & Birch, LLP

(57) ABSTRACT

To provide a small-sized vehicle in which a convenient pocket is provided in a single driver's seat portion. Furthermore, a brake master cylinder is disposed by making effective use of space without reduction of the capacity of the pocket, and the maintenance of a reservoir tank of the brake master cylinder thus disposed is ensured. A meter cover portion is disposed in a pocket of an inner panel at a position offset rightwardly from the center in the width direction of the vehicular body to form small and large capacity pocket parts on the right and left sides of the vehicle. A brake pedal is disposed on the right side of a steering column extending in an approximate center line in the width direction of the vehicular body, and a brake master cylinder connected to the brake pedal is disposed behind the meter cover portion. Such a layout is advantageous since it allows a driver to easily operate the pedals while ensuring the pocket capacity. Furthermore, the layout allows connection of the brake pedal to the brake master cylinder in series with a simple mechanism.

16 Claims, 8 Drawing Sheets

SMALL-SIZED VEHICLE

BACKGROUND OF THE INVENTION

1. Field of the Invention

The present invention relates to a small-sized vehicle for allowing about one or two persons to ride therein. In particular, the present invention relates to a small-sized vehicle having a body that is relatively narrow in width and including a single driver's seat.

2. Description of Related Art

In recent years, from the viewpoint of reducing the amount of exhaust gas and power consumption of a vehicle, a small-sized vehicle which allows about one or two persons to ride therein has been developed and practically used.

Such a small-sized vehicle includes an engine having a small displacement or an electric motor (or a combination of an engine and an electric motor). The vehicle is used as a means to allow a small number of persons to be easily moved with reduced fuel consumption and a reduced amount of exhaust gas.

A small-sized vehicle of this type is known from Japanese Patent Laid-open No. Hei 9-286348. This small-sized vehicle has a body structure including a body frame formed by a pipe made from a metal such as aluminum. The frame is covered with a resin made body cover divided into two parts in the vertical direction, wherein the upper body cover constitutes a roof and the lower body cover constitutes a driver's seat portion. Furthermore, these body covers constitute a cabin for a single driver's seat.

A small-sized vehicle of this type requires not only a reduction in weight, but also a reduction in cost by simplifying the structure of the vehicle to reduce the number of parts and the assembling steps. Such a small-sized vehicle is used as an easy moving means; however, in order for a driver to use the vehicle comfortably, it is required that a pocket for containing a driver's portable articles be provided in a cabin of the vehicle.

For a small-sized vehicle of this type, however, it is difficult to ensure a pocket space large enough to contain a driver's portable articles because the size of the body of the vehicle is relatively small when compared to traditional vehicles. In particular, for a small-sized vehicle of a single driver's seat type or a tandem type including a single driver's seat and a pillion disposed behind the driver's seat, the width of the driver's seat portion is narrow. Accordingly, a space in front of the driver's seat portion is occupied by parts necessary for operation of the vehicle, such as a steering wheel, meters, an accelerator pedal, and a brake pedal. In view of this, only a very narrow pocket space remains for containing a driver's portable articles.

SUMMARY OF THE INVENTION

In view of the foregoing, an object of the present invention is to provide a small-sized vehicle capable of making effective use of a space in front of a driver's seat while ensuring a simple structure.

A specific object of the present invention is to provide a small-sized vehicle in which a convenient pocket is provided in a single driver's seat portion. Furthermore, a rake master cylinder is disposed in the vehicle by making effective use of space within he vehicle without any reduction of the capacity of the pocket. In addition, the maintenance of a reservoir tank of the brake master cylinder thus disposed is ensured.

Other objects will be clearly understood in the following description.

To achieve the above object, according to the present invention, there is provided a small-sized vehicle including only one driver's seat, comprising: an inner panel provided with a pocket and having a width nearly equal to the width of a body of the vehicle is provided in front of the driver's seat; and a meter is disposed in the pocket at a position offset from the center in the width direction of the body of the vehicle.

The vehicular width of a small-sized vehicle of a single driver's seat type is essentially narrow. Accordingly, even if a pocket having a width nearly equal to the width of the vehicle is formed in front of the driver's seat, the capacity of the pocket is still insufficient. On the other hand, it may be considered that a meter should be provided in front of the driver's seat at the center in the width direction of the body of the vehicle, since a meter at the center is easily visible to a driver. If the meter is disposed in the pocket at the center in the width direction of the body of the vehicle under such a consideration, then the inside of the pocket is equally divided into relatively small capacity parts on both sides of the meter. These relatively small capacity pocket parts disposed on both sides of the meter can contain only relatively small articles. That is to say, the usability of these relatively small capacity pocket parts is poor. On the contrary, according to the present invention, since the meter is disposed in the pocket at a position offset from the center in the width direction of the vehicular body, a small capacity pocket part and a large capacity pocket part are formed on the right and left sides of the meter. As a result, the small and large capacity pocket parts can be used according to the sizes of articles to be contained.

In the small-sized vehicle according to the present invention, preferably, the meter is disposed in the pocket at a position offset rightwardly from the center in the width direction of the vehicular body; a steering column is disposed in such a manner as to extend along an approximately center line in the width direction of the body of the vehicle; an accelerator pedal and a brake pedal are disposed on the right side of the steering column; and a brake master cylinder connected to the brake pedal is disposed behind the meter disposed in the pocket of the inner panel.

With this configuration, it is possible to realize a layout which is convenient to a driver, since the steering column is disposed along an approximately center line in the width direction of the body of the vehicle and the accelerator pedal and brake pedal are disposed on the right side of the steering column. Furthermore, since the brake master cylinder connected to the brake pedal is disposed substantially directly over the brake pedal, it is possible to connect the brake pedal to the brake master cylinder with a simple mechanism. This eliminates the inconvenience of the brake master cylinder projecting into a portion, other than the meter portion, of the pocket and hence to ensures a sufficient pocket capacity.

In the small-sized vehicle according to the present invention, preferably, a steering column cover projecting forwardly from the inner panel is formed integrally with the inner panel by resin molding; and a front end portion of the steering column cover is formed into a shape which allows the front end portion to be raised via a hinge; whereby when the front end portion of the steering column cover is raised, a space formed behind the steering column cover is opened, to allow a reservoir tank of the brake master cylinder be visually checked through the space.

With this configuration, upon inspection or the like, an operator can easily visually check the oil level of the reservoir tank through a space formed around the steering column by raising the front end portion of the steering column cover. In particular, for a small-sized vehicle, since the main device requiring maintenance such as the power unit is disposed at a rear portion of the vehicle and the steering mechanism not requiring as much maintenance is disposed at a front portion of the vehicle, a front body cover can be configured as a molded integral part having a simple, inexpensive structure with no openable bonnet. By adopting the structure of the present invention which allows for visual checking of the reservoir tank, it is possible to configure the front body cover as a molded integral part while allowing for easy maintenance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, one embodiment of the present invention will be described in detail with reference to the accompanying drawings.

As shown in FIGS. 1 to 5, a small-sized vehicle according to this embodiment is configured as a four-wheeled vehicle including two front wheels 1 and two rear wheels 2. A single seat 3 on which only a driver is to sit is provided at a central portion of the vehicle.

Figure 6:
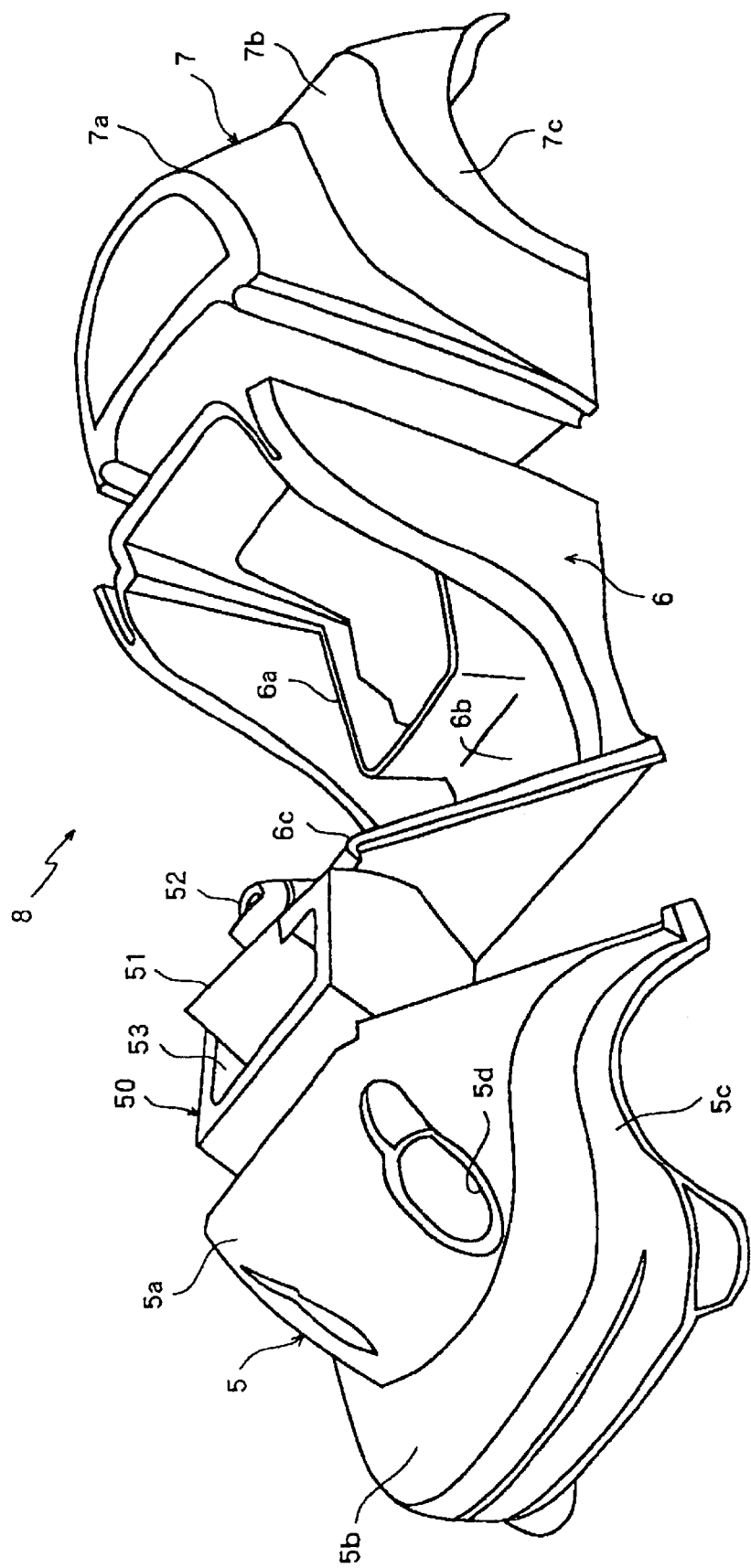
FIG. 6 is an exploded perspective view of a body cover according to the embodiment of the present invention.

The small-sized vehicle has a basic body structure in which a body frame 4 formed by a pipe made from a metal such as aluminum is covered with a resin made body cover 8. As shown in FIG. 6, the body cover 8 is divided into three parts, i.e., a front body cover 5 constituting a front portion, a center body cover 6 constituting a central portion, and a rear body cover 7 constituting a rear portion. A resin made roof panel 9 is provided over the center body cover 7 to cover the upper side of the driver's seat 3, thereby forming a cabin at the central portion of the vehicle. In addition, reference numeral 50 designates an inner panel provided in front of the driver seat. Inner panel 50 has a width nearly equal to the vehicle width.

Figure 1:
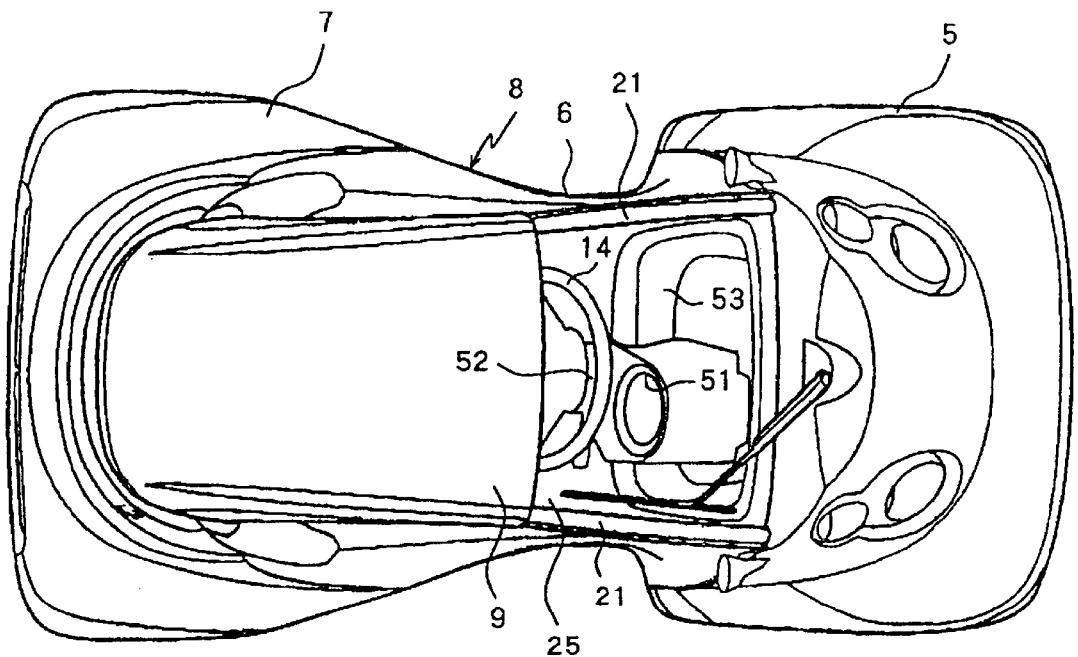
FIG. 1 is a plan view of a small-sized vehicle according to one embodiment of the present invention.
Figure 2:
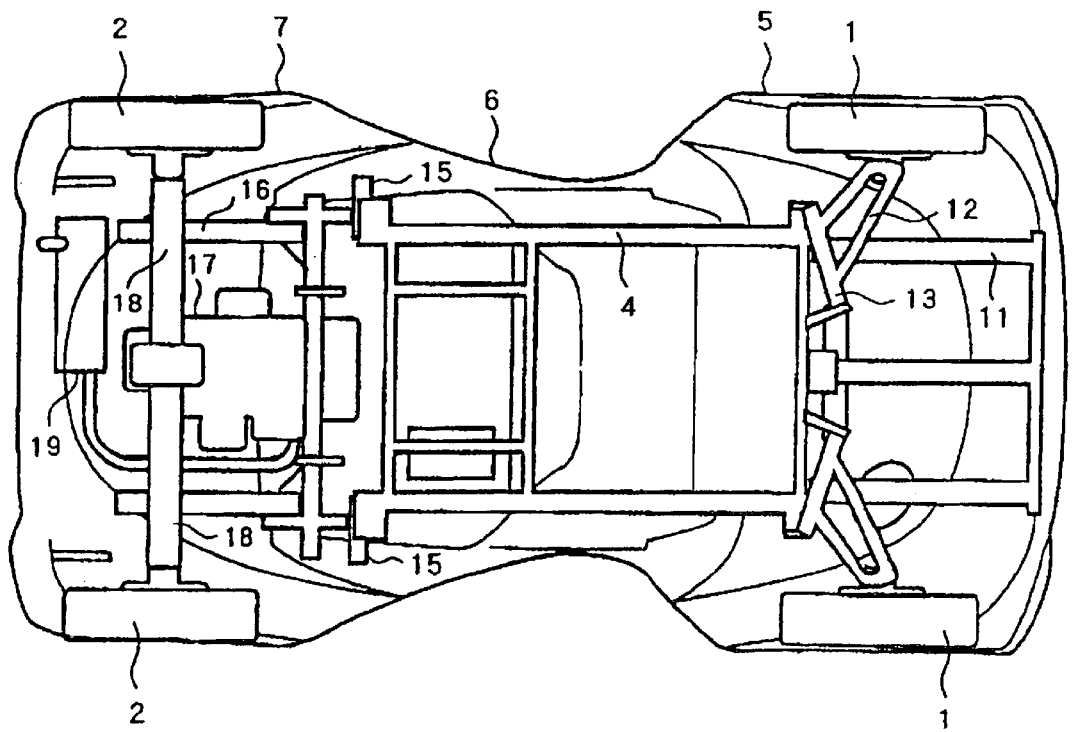
FIG. 2 is a bottom view of the small-sized vehicle according to the embodiment of the present invention.
Figure 3:
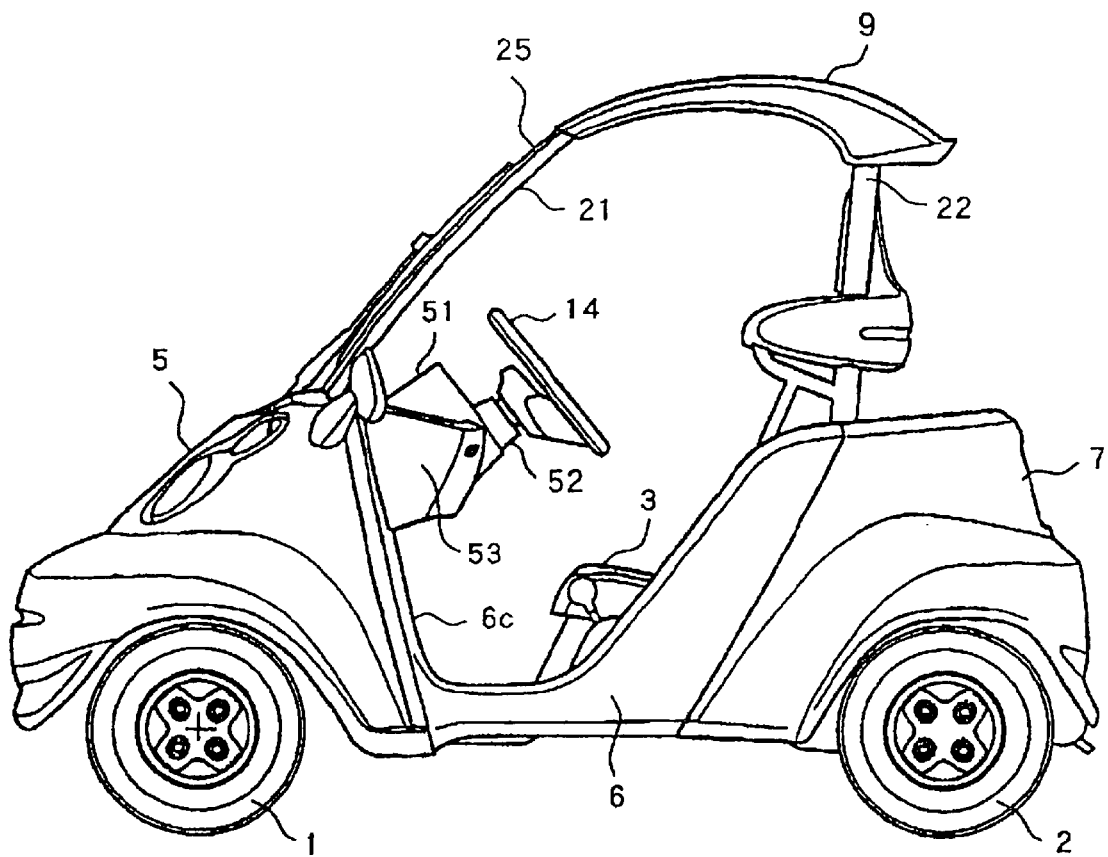
FIG. 3 is a left side view of the small-sized vehicle according to the embodiment of the present invention.
Figure 4:
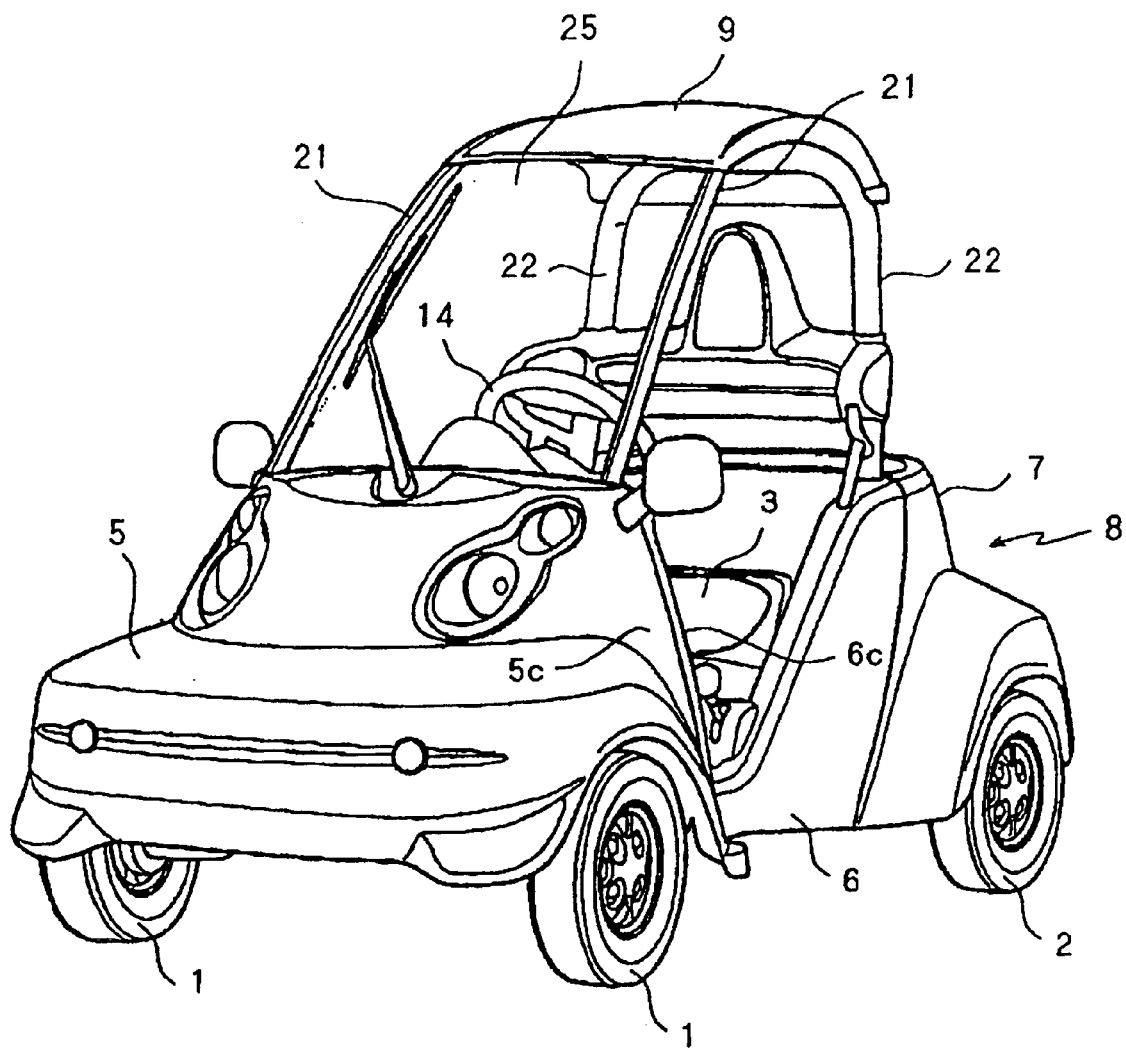
FIG. 4 is a perspective view, seen from the front side, of the small-sized vehicle according to the embodiment of the present invention.
Figure 5:
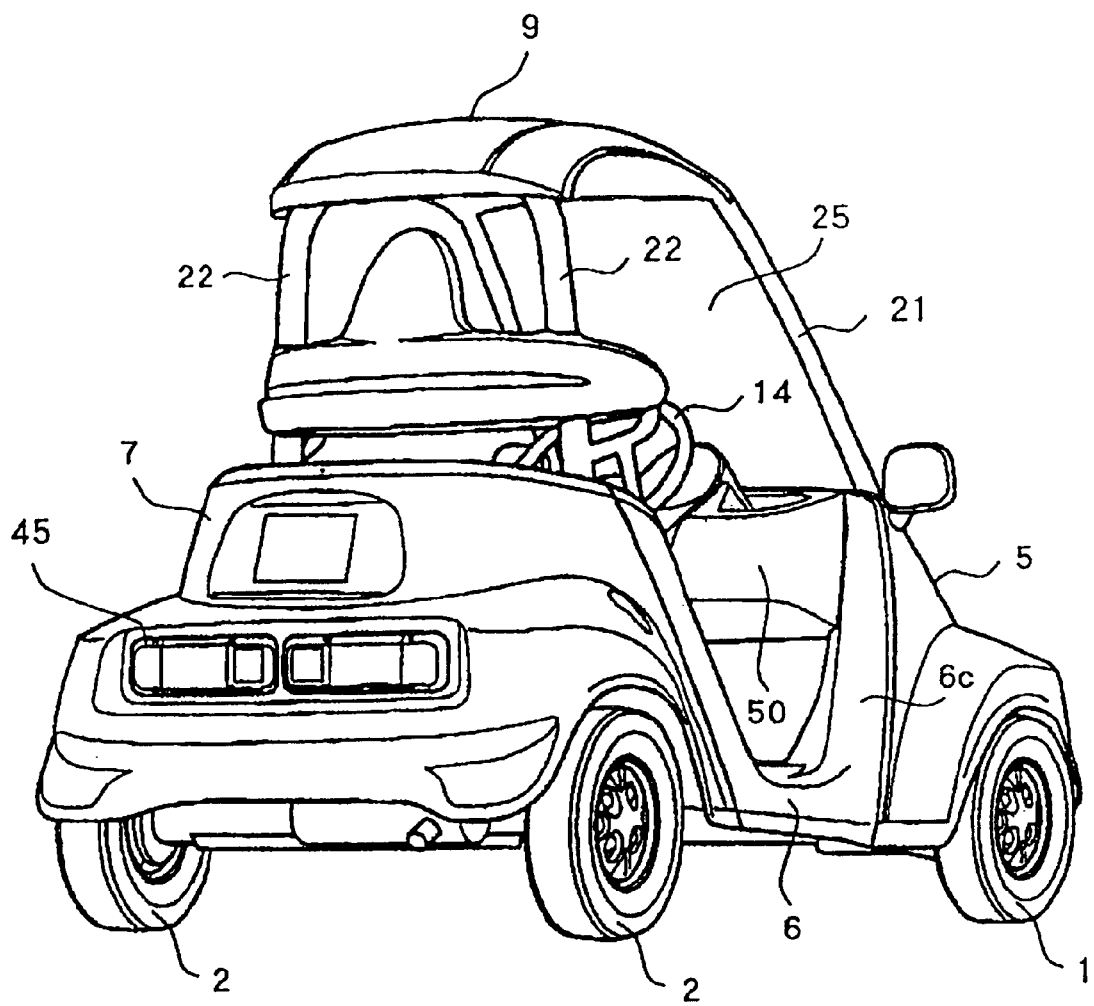
FIG. 5 is a perspective view, seen from the back side, of the small-sized vehicle according to the embodiment of the present invention.

Referring to FIG. 2, three front beams 11 made from a metal such as aluminum are provided on the inner side of the front body cover 5 in such a manner as to protrude from the body frame 4. The front beams 11 function to support and absorb a load applied from the front side of the vehicle.

A pair of front arms 12 are mounted to the front portion of the body frame 4. Each front arm 12 is swingable around a pivot 13 and rotatably supports, at its the leading end, the front wheel 1. When a steering force is applied from a steering wheel 14 to the front arms 12 via a steering mechanism (not shown), the front wheels 1 are turned to change the running direction of the vehicle.

A swing frame 16 is mounted to the rear portion of the body frame 4 in such a manner as to be swingable around a pair of pivots 15. A power unit 17, which integrally includes an internal combustion engine, an automatic transmission, a differential mechanism, and the like, is provided on the swing frame 16. A pair of axle shafts 18 protrude from the differential mechanism of the power unit 17. Furthermore, the rear wheels 2 are mounted to the leading ends of the axle shafts 18, whereby the rear wheels 2 are driven by power supplied from the power unit 17.

In FIG. 2, reference numeral 19 designates an exhaust system, including an exhaust pipe and a muffler, extending from the engine of the power unit 17. In addition, a suspension mechanism (not shown) is provided between the swing frame 16 and the body frame 4.

The body structure of the above-described small-sized vehicle will now be described in more detail.

The roof panel 9 is supported by a pair of front pillars 21 and a pair of rear pillars 22. The front pillars 21 are erected from the body frame 4 with lower ends thereof supported by the body frame 4. To be more specific, the front pillars 21 extend upwardly, while slightly tilting rearwardly, from a joint portion between the front body cover 5 and the center body cover 6. The rear pillars 22 are erected from the body frame 4 with lower ends thereof supported by the body frame 4. To be more specific, the rear pillars 22 extend upwardly nearly in the vertical direction from a joint portion between the center body cover 6 and the rear body cover 7.

Each of the front pillars 21 and the rear pillars 22 is formed by a long-sized skeleton pipe made from a metal such as aluminum. The surface of the aluminum is covered with a resin or rubber layer formed by molding. The long-sized skeleton pipes constituting the front and rear pillars 21 and 22 have a rigidity and a strength which is large enough to support the roof panel 9. In this embodiment, the upper ends of the rear pillars 22 are erected on right and left sides of the seat 3 and are connected to each other into a U-shape. This construction of the rear pillars 22 forms a roll bar which surrounds side and upper portions of a driver sitting on the seat 3.

The front pillars 21 are erected on both sides of a front portion of the cabin to support the roof panel 9 and also to hold both side portions of a front window panel 25 made from a transparent resin or glass material therebetween.

As shown in FIG. 6, the body cover 8 is of a three-part divided structure including the front body cover 5, center body cover 6, and rear body cover 7 as described above. Each of the resin made body cover parts 5, 6, and 7 is formed into a specific shape.

The front body cover 5 includes a front hood portion 5a formed into a rounded shape, a front bumper portion 5b swelled forwardly from a front portion of the front hood portion 5a, and a front fender portion 5c swelled sideways from both sides of the front hood portion 5a. The front hood portion 5a has a pair of holes 5d for containing front light units.

The center body cover 6 includes a cabin floor portion 6b, a seat base portion 6a formed on the cabin floor portion 6b, and a dash panel portion 6c formed on a front portion of the cabin floor portion 6b. In addition, the seat 3 is provided on the seat base portion 6a. The rear body cover 7 includes a rear hood portion 7a formed into a rounded shape, a rear bumper portion 7b swelled from a rear portion of the rear hood portion 7a, and a rear fender portion 7c swelled sideways from the rear hood portion 7a in such a manner as to cover the rear wheels 2.

These body cover parts 5, 6 and 7 are joined to each other by screws or the like, to constitute the body cover 8. In addition, the inner panel 50 is mounted on an upper portion of the dash panel portion 6c.

The inner panel 50 is an integral part formed by resin molding and is provided separately from the body cover parts 5, 6 and 7. The inner panel 50 integrally includes a cylindrical meter cover portion 51 for containing meters such as a speedometer, a column cover portion 52 through which a steering column passes, and a pocket portion 53 formed around the meter cover portion 51.

The pocket portion 53 has a width nearly equal to the width of the body of the vehicle. The meter cover portion 51 for containing meters is preferably disposed at a position slightly offset rightwardly from the inner central portion of the pocket portion 53 in the width direction of the body of the vehicle. Accordingly, a small pocket capacity is formed on the right side of the meters and a large pocket capacity is formed on the left side of the meters.

A steering column 14a for connecting the steering wheel 14 to a front wheel steering mechanism (not shown) extends along an approximately center line in the width direction of the body of the vehicle so as to make the steering wheel 14 face directly to a driver sitting on the seat 3. An accelerator pedal 61 and a brake pedal 62 are disposed on the right side of the steering column 14a so that the driver can operate both of the pedals 61 and 62 with the right foot without interference with the steering column 14a. With this layout of the steering column 14a and the pedals 61 and 62, a driver can easily operate the vehicle.

Figure 9:
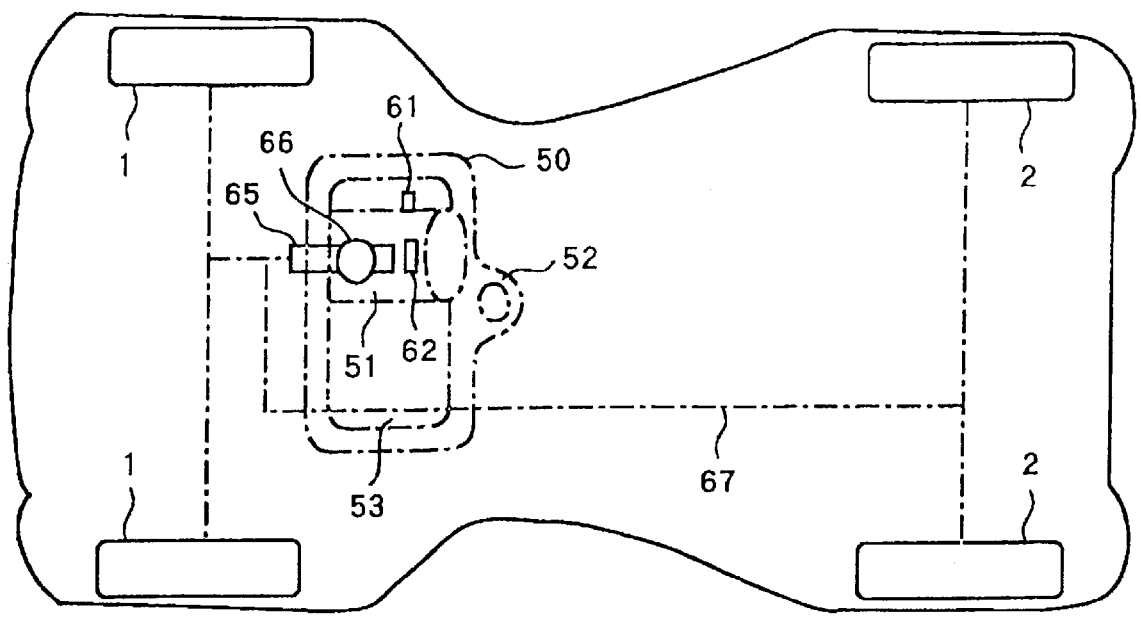
FIG. 9 is a plan view of a brake piping line according to the embodiment of the present invention.

Referring to FIG. 9, a brake master cylinder 65 connected to a brake pedal 62 is disposed behind the meter cover portion 51 of the inner panel 50. Since the meter cover portion 51 is slightly offset rightwardly from the center in the width direction of the body of the vehicle and the brake pedal 62 is disposed on the right side of the steering column 14a which extends along the center line in the width direction of the vehicular body, the brake master cylinder 65 is positioned approximately directly over the brake pedal 62. In FIG. 9, reference numeral 67 designates a piping line extending from the brake master cylinder 65 to the front and rear wheels 1 and 2.

The layout of the brake master cylinder 65 as described above is advantageous since it prevents the brake master cylinder 65 from projecting into a portion of the vehicle other than the meter portion in the pocket. Accordingly, it ensures a sufficient pocket capacity. Furthermore, it allows connection of the brake pedal 62 to the brake master cylinder 65 without the use of a complicated link mechanism for changing the connecting direction of the brake master cylinder 65 to the brake pedal 62.

Figure 7:
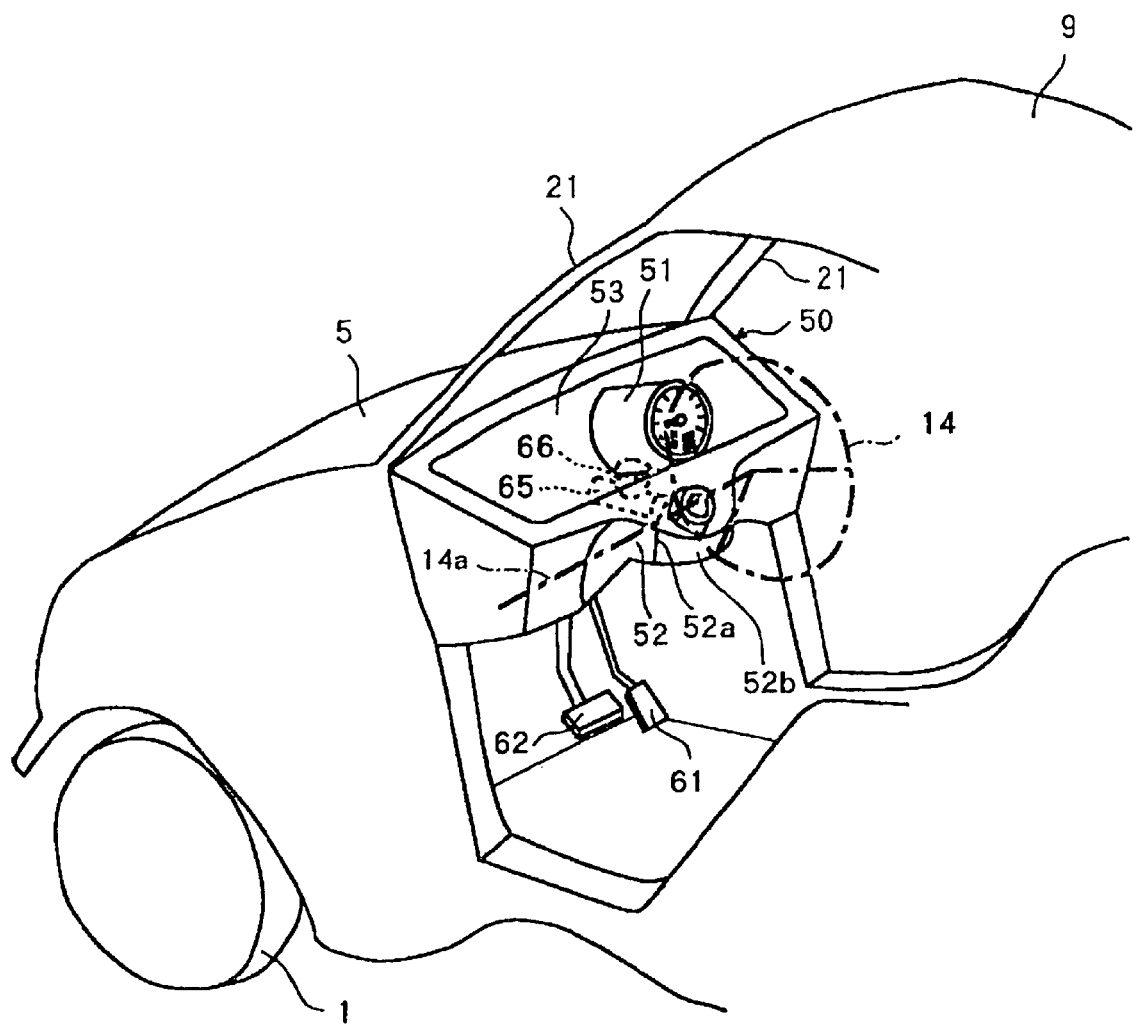
FIG. 7 is a perspective view of an inner panel and its neighborhood according to the embodiment of the present invention.
Figure 8:
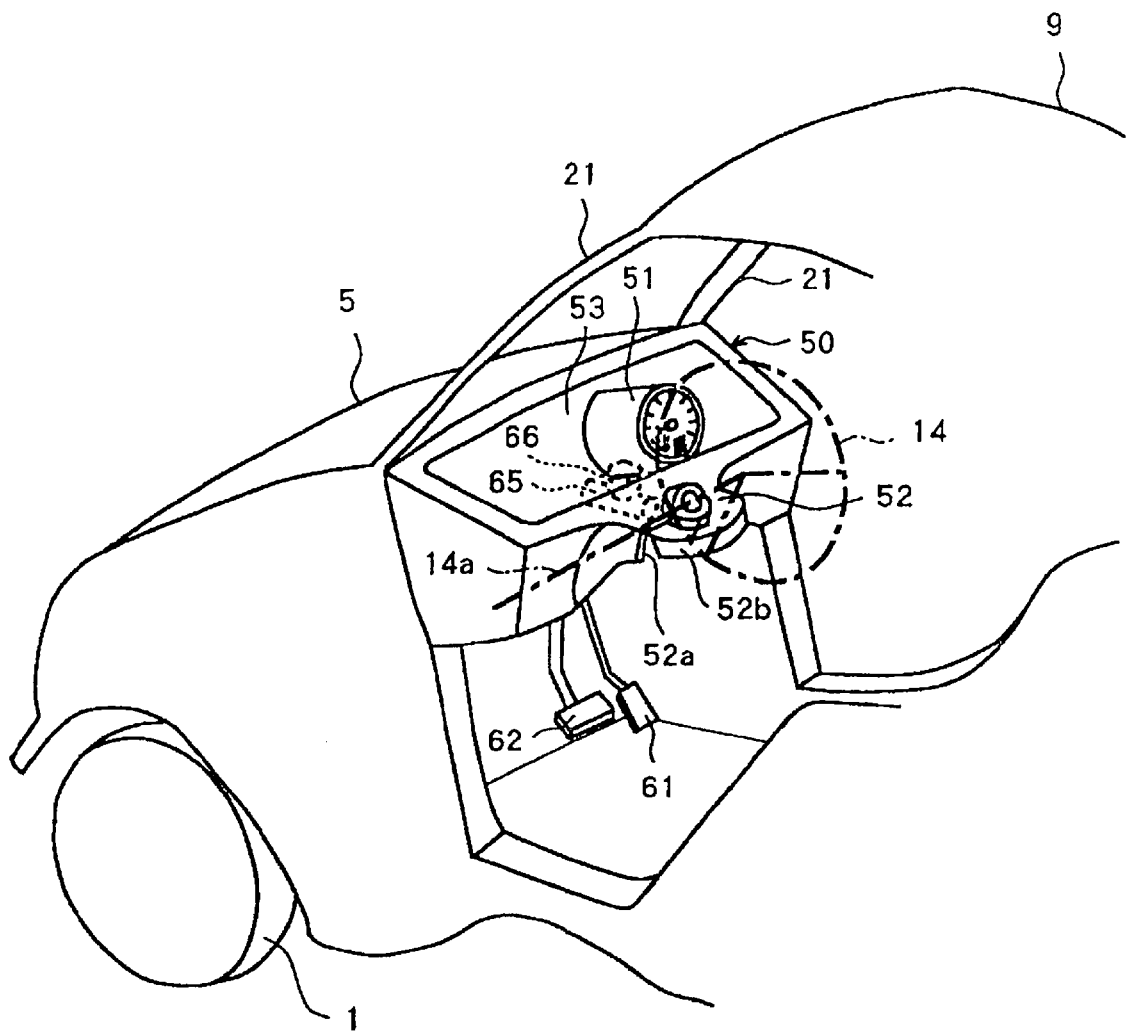
FIG. 8 is a perspective view of the inner panel and its neighborhood in a state in which a column cover front end portion is opened, according to the embodiment of the present invention.

A column cover portion 52 projecting forwardly from the inner panel 50 is formed integrally with the inner panel 50 by molding a resin such as polypropylene. As shown in FIGS. 7 and 8, cutouts 52a are formed in both of the side walls of the column cover portion 52. With these cutouts 52a, a front end portion 52b of the column cover portion 52 can be raised. To be more specific, by forming the cutouts 52a, an upper surface portion of the column cover portion 52, which is made from a flexible resin material functions as a hinge. Consequently, as shown in FIG. 8, the front end portion 52b of the column cover portion 52 can be raised.

With this configuration, by raising the front end portion 52b of the column cover portion 52, a space formed behind the column cover portion 52 is opened. This allows the back side of the inner panel 50 to be easily observed through the space, with a result that a reservoir tank 66 connected to the brake master cylinder 65 can be easily visually checked.

While an embodiment has been described by example of a four-wheeled vehicle on which only a driver is allowed to ride and which is driven by an internal combustion engine, the present invention may be variously applied. For example, the present invention may be applied to four-wheeled vehicles of types in which an electric motor or a combination of an electric motor and an internal combustion engine is used as the drive supply, a plurality of passengers are allowed to ride in a tandem manner, a suspension type different from that described in the above-described embodiment is used, and/or a body cover formed by metal working is used. In addition, the present invention may be applied to a three-wheeled vehicle.

With regard to the making of the right and left pocket capacities of the inner panel different from each other, the inner panel may be made not from a resin but a metal, or the meters may be offset leftwardly from the center in the width direction of the vehicular body.

As described above, according to the present invention, since meters are disposed in the pocket of the inner panel, which is disposed in front of the driver's seat and has a width nearly equal to the width of the vehicular body, in such a manner as to be offset from the center in the width direction of the vehicular body, a small capacity pocket portion and a large capacity pocket portion are formed on the right and left sides of the meters. These small and large capacity pocket portions can be used in matching to the sizes of articles to be contained.

According to the present invention, since the meters are disposed at positions offset rightwardly from the center in the width direction of the vehicular body, the accelerator and brake pedals are disposed on the right side of the steering column extending in an approximately center line in the width direction of the vehicular body, and the brake master cylinder connected to the brake pedal is disposed behind the meters disposed in the inner panel, it is possible to realize the layout of the pedals and steering wheel to allow a driver to easily operate the pedals without interference with the steering wheel, and to connect the brake pedal to the brake master cylinder with a simple mechanism while ensuring the pocket capacity of the inner panel.

According to the present invention, since the front end portion of the steering column cover formed integrally with the inner panel by resin molding is raiseable via a hinge, a space formed behind the steering column cover can be opened by raising the front end portion of the steering column cover. Accordingly, the reservoir tank provided for the brake master cylinder can be visually checked via the space opened by raising the front end portion of the steering column cover. As a result, it is possible to easily inspect the brake liquid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A small-sized vehicle, comprising:
    a single driver's seat;
    an inner panel provided in front of said driver's seat, said inner panel being provided with four upstanding walls forming a pocket having a width substantially equal to a width of a body of the vehicle; and
    a meter disposed in said pocket at a position offset from a center in a width direction of the body of the vehicle.

2. The small-sized vehicle according to claim 1, wherein said meter is disposed in said pocket at a position offset rightwardly from the center in the width direction of the body of the vehicle, said vehicle further comprising:
    a steering column extending along an approximate centerline in the width direction of the body of the vehicle;
    an accelerator pedal and a brake pedal disposed on the right side of said steering column; and
    a brake master cylinder connected to said brake pedal, said brake master cylinder being disposed behind said meter.

3. The small-sized vehicle according to claim 2, further comprising:
    a steering column cover projecting from said inner panel, said steering column cover being formed integrally with said inner panel by resin molding;
    a front end portion of said steering column cover is formed into a shape allowing said front end portion to be raised via a hinge; and
    whereby when said front end portion of said steering column cover is raised, a space formed behind said steering column cover is opened, to allow a reservoir tank provided for said brake master cylinder to be visually checked through said space.

4. The small-sized vehicle according to claim 3, wherein said column cover includes cutout portions on opposite sides thereof, said hinge being formed by flexible resin material located between said inner panel and said steering column cover.

5. The small-sized vehicle according to claim 1, wherein the body of the vehicle is a three-part divided structure including a front body cover, a center body cover and a rear body cover, each of said front body cover, said center body cover and said rear body cover being a single molded part, and said inner panel is located between said front body cover and said center body cover.

6. The small-sized vehicle according to claim 2, wherein the body of the vehicle is a three-part divided structure including a front body cover, a center body cover and a rear body cover, each of said front body cover, said center body cover and said rear body cover being a single molded part, and said inner panel is located between said front body cover and said center body cover.

7. A vehicle, comprising:
    a molded body;
    a driver's seat, said driver's seat being located at a center in a width direction of said body;
    an inner panel provided in front of said driver's seat, said inner panel being provided with four upstanding walls forming a pocket having a width substantially equal to a width of said body of the vehicle; and
    a meter disposed in said pocket at a position offset from the center in the width direction of the body of the vehicle.

8. The vehicle according to claim 7, wherein said meter is disposed in said pocket at a position offset rightwardly from the center in the width direction of the body of the vehicle, said vehicle further comprising:
    a steering column extending along an approximate center line in the width direction of the body of the vehicle;
    an accelerator pedal and a brake pedal disposed on the right side of said steering column; and
    a brake master cylinder connected to said brake pedal, said brake master cylinder being disposed behind said meter.

9. The vehicle according to claim 8, further comprising:
    a steering column cover projecting from said inner panel, said steering column cover being formed integrally with said inner panel by resin molding;
    a front end portion of said steering column cover is formed into a shape allowing said front end portion to be raised via a hinge; and
    whereby when said front end portion of said steering column cover is raised, a space formed behind said steering column cover is opened, to allow a reservoir tank provided for said brake master cylinder to be visually checked through said space.

10. The vehicle according to claim 9, wherein said column cover includes cutout portions on opposite sides thereof, said hinge being formed by flexible resin material located between said inner panel and said steering column cover.

11. The vehicle according to claim 7, wherein the body of the vehicle is a three-part divided structure including a front body cover, a center body cover and a rear body cover, each of said front body cover, said center body cover and said rear body cover being a single molded part, and said inner panel is located between said front body cover and said center body cover.

12. The vehicle according to claim 8, wherein the body of the vehicle is a three-part divided structure including a front body cover, a center body cover and a rear body cover, each of said front body cover, said center body cover and said rear body cover being a single molded part, and said inner panel is located between said front body cover and said center body cover.

13. An inner panel for a small-sized vehicle, said vehicle including a single driver's seat and a molded body, said inner panel being locatable in front of the driver's seat and comprising:
    four upstanding walls forming a pocket having a width substantially equal to a width of the body of the vehicle; and
    a meter disposed in said pocket at a position offset from a center in a width direction of the body of the vehicle.

14. The inner panel for a small-sized vehicle according to claim 13, wherein said meter is disposed in said pocket at a position offset rightwardly from the center in the width direction of the body of the vehicle.

15. The inner panel for small-sized vehicle according to claim 14, said vehicle further including: a steering column extending along an approximate center line in the width direction of the body of the vehicle; an accelerator pedal and a brake pedal disposed on the right side of said steering column; and a brake master cylinder connected to said brake pedal, said brake master cylinder being disposed behind said meter, said inner panel further comprising:

a steering column cover projecting from said inner panel, said steering column cover being formed integrally with said inner panel by resin molding;

a front end portion of said steering column cover is formed into a shape allowing said front end portion to be raised via a hinge; and whereby when said front end portion of said steering column cover is raised, a space formed behind said steering column cover is opened, to allow a reservoir tank provided for said brake master cylinder to be visually checked through said space.

16. The inner panel for a small-sized vehicle according to claim 15, wherein said column cover includes cutout portions on opposite sides thereof, said hinge being formed by flexible resin material located between said inner panel and said steering column cover.

* * * * *